though not imperative, that room be left for a few turns

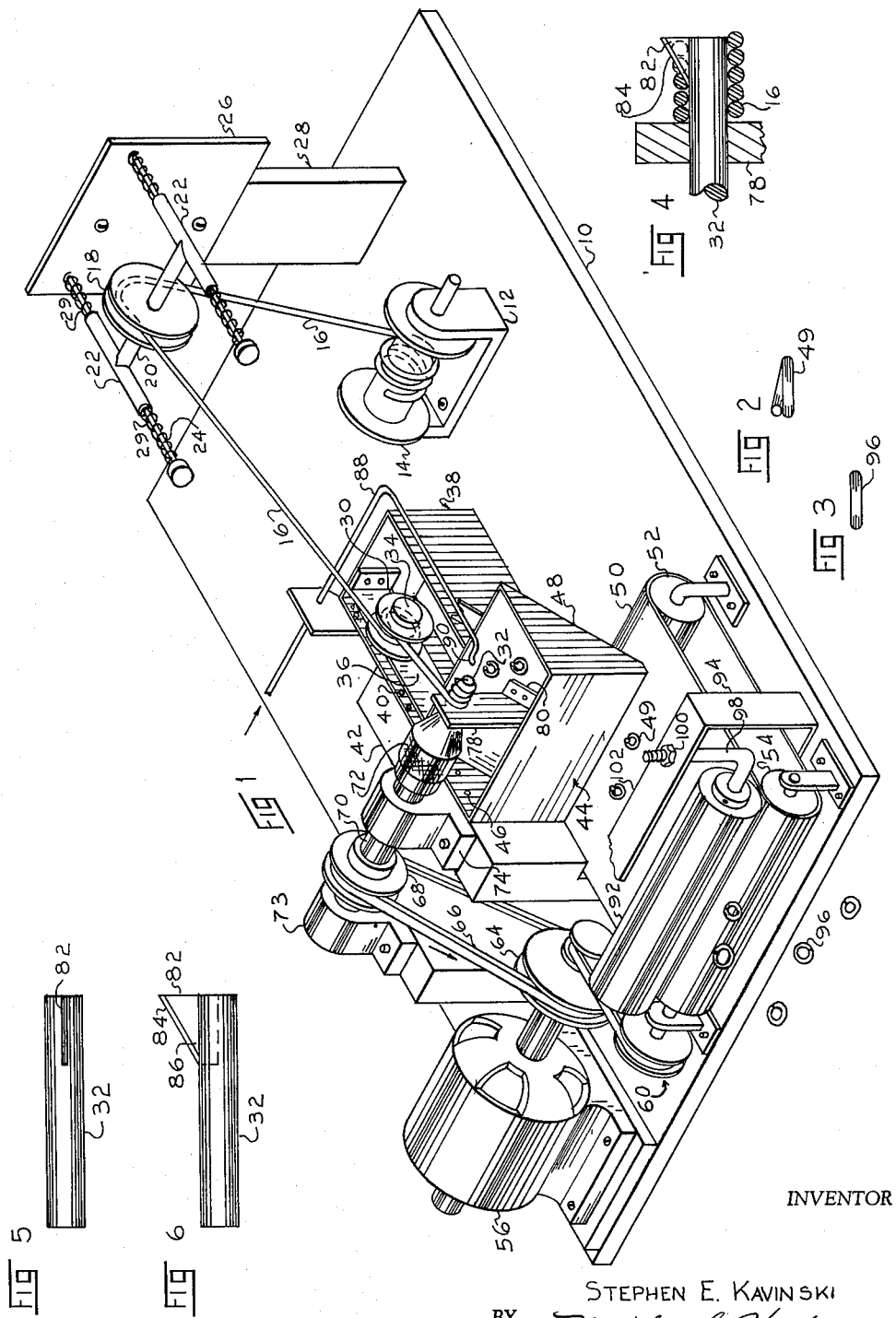

United States Patent Office 2,977,999
Patented Apr. 4, 1961

2,977,999

RING FORMING MECHANISM

Stephen E. Kavinski, York, Pa., assignor to Sylvania Electric Products Inc., a corporation of Delaware Filed Apr. 22, 1959, Ser. No. 808,144

6 Claims. (Cl. 140—88)

This invention relates to mechanism for forming rings.

In particular it relates to mechanism for forming rings at a very high rate of speed.

It is an object of the invention to provide a mechanism for forming rings which shall be very simple in construction.

It is a further object of the invention to provide a mechanism which shall operate to produce the rings at an exceedingly rapid rate.

It is yet another object of the invention to provide a mechanism to cut up filamentary material and form them into rings without the use of reciprocating elements.

A still further object of the invention is to provide a means for forming one turn helices and finally flattening the helices to form planar rings.

These and other objects will become apparent upon consideration of the following specification when taken in conjunction with the accompanying drawing in which:

Fig. 1 is a perspective view of the ring forming and flattening mechanism.

Fig. 2 is a view of the helical ring formed by the cutting of the wire on a mandrel.

Fig. 3 is an end view of a completed ring.

Fig. 4 is a section through a thrust plate showing a mandrel with cutter blade therein and the filamentary material in section.

Fig. 5 is a top view of a mandrel with its cutter blade and

Fig. 6 is a side view of the mandrel and blade shown in Fig. 5.

Now referring to the mechanism in greater detail, at 10 is a table on which is mounted a bracket 12 rotatably supporting a spool 14 of filamentary material 16 such as wire, solder, or flux-cored solder. The material, e.g., flux-cored solder wire, is threaded over a grooved idler roll 18, whose axle 20 is supported by sleeves 22 slidable on capped rods 24 extending laterally from a plate 26 fastened to a stanchion 28 in turn fastened to the table. Springs 29 surrounding the rods act on the sleeves 22 to resiliently maintain the roll 18 in position. The solder wire is then wrapped once around about an idler roll 30 with wide grooved face to impose a slight drag on the wire and then the wire is fed to a rotating mandrel 32 for the wire to be formed into helical or spiral split rings as will be described. The roll 30 is rotatably mounted on a headed stub axle 34 fastened to a cross plate 36 the ends of which are secured to the vertical walls of a tank 38, in the form of a parallelepiped. The plate is supported with its lower edge well above the bottom of the tank to permit free flow of liquid, such as alcohol, in the tank, the wheel and solder wire dipping into the liquid. The purpose of the liquid is to wet the surface of the solder wire to facilitate lateral slippage of coils of the wire on the mandrel, as will be described, and an evaporative type of liquid is preferably utilized to finally leave a dry product, and to lubricate and cool a knife blade, to be described.

The tank is suitably supported, as by screws 40, to a back plate 42 rising from the table and lies adjacent a hopper 44 also fastened, as by screws 46, to the back plate. The hopper includes a rear inclined wall 48 down which the split rings 49, when formed, will slide, the rings dropping onto an endless conveyor belt 50 the top run of which is at a level slightly below the mouth of the hopper. The conveyor belt is wrapped around an idler roller 52 suitably rotatably supported on the table and about a drive roller 54 supported by the table and driven by means of a motor 56 through a pulley and belt mechanism 60.

The motor 56, by means of a driving pulley 64, belt 66, and driven pulley 68, drives a chuck spindle 70 on which is mounted a conventional chuck 72 holding the mandrel 32. The spindle is journaled in bearings 73 and 74 suitably mounted on the table. The mandrel 32 passes snugly through a thrust plate 78 fastened in any conventional fashion against movement as by means of an angled plate 80 secured to the thrust plate and the inclined wall 48 of the trough 44. The thrust plate may be made of wood so that the filamentary material may eventually cut a guiding spiral therein, or of harder wear resistant material, though wood is preferred to allow for formation of the spiral within the surface of the wood. The mandrel 32 is provided with a knife blade 82 of hard metal, peened, brazed or otherwise suitably secured in a slot at the end of the mandrel, the blade having a cutting edge 84 which is set at approximately 30° to the axis of the mandrel and of sufficient length along the mandrel to span over more than the diameter of one turn of the solder wire and preferably over more than two diameters of the solder wire or other filamentary material, for a purpose to be described. Also it is desirable, of filamentary material between the back plate and the lower corner 86 of the blade. The motor may revolve quite quickly, as at 1200 revolutions per minute, and the drive ratio between motor shaft and spindle may be selected at 1 to 1:5 to give a mandrel speed of 1800 revolutions per minute. The operator initially takes the end of the solder wire 16 and wraps it counterclockwise about the mandrel, as viewed in Fig. 1, from the thrust plate 78 toward the operator and thrusts the loose end of the wire hard down over the cutting edge of blade 82 near the end 86 thereof so that the free end of the wire would be anchored to prevent wire coil unraveling. Now when the motor is started, the knife will pull on the filamentary material and continue to wind the material on the mandrel, the material squeezing in between the thrust plate and the coil next adjacent thereto. This action is assisted by the liquid surface on the solder wire picked up from the tank 38. Also the coils in advance of the just formed coil will be forced to slide along the mandrel, the first coil then being gradually sliced off from the rest of the solder wire by the inclined edge 84 of the blade. The inclination of the knife, its length and its height are all selected so that preferably one turn of wire or solder wire is just being nicked by the blade to hold it against slipping circumferentially of the mandrel while a second turn is more nearly sliced completely through its diameter and a third turn is completely sliced. All turns or spiral solder rings in advance of the third turn have been completely sliced and have fallen down into and through the hopper. To assist the helical split rings down the inclined wall of the chute, there is provided a suitably supported air pipe 88 with a nozzle 90 directly below the free end of the mandrel and directed downwardly along the inclined wall of the hopper.

The rings as cut by the knife 82, as pointed out heretofore, are helical and in some instances it may be desirable to flatten the helix or spiral to a planar ring form.

This is accomplished by means of a roller 92 supported by a gantry 94 rising from the table.

The roller is set at a height above the belt so as to squeeze the helical ring to a planar form as shown at 96 in Fig. 3. To accommodate various diameters of solder wire, the roller 92 may be made vertically adjustable by providing it with hangers 98 threaded at their upper ends and passing through holes in the gantry. The threaded ends are provided with nuts 100 above and below the horizontal plate 102 of the gantry (only the upper nut being shown) to permit of vertical adjustment of the roller 92. The circular rings 96 thus drop from between the roller 92 and belt 50 and may be collected in any suitable fashion.

Having thus described the invention what is claimed is:

1. Mechanism for forming a filamentary material into helices comprising a chuck, means for rotating the chuck, a mandrel held by said chuck, and a cutting mechanism consisting of a single fixed sharp edged cutting blade carried by and extending laterally of the mandrel and outside of the periphery thereof at a point spaced from the chuck and a thrust plate positioned between the chuck and the blade, whereby when a wire is fed onto the mandrel between the plate and the blade, the knife, by itself, will effect a severing of the wire.

2. Mechanism for forming a filamentary material into helices comprising a support, a chuck rotatably mounted in the support, means for rotating the chuck, a mandrel held by said chuck, and a cutting mechanism consisting of a single fixed sharp edged cutting blade carried by and extending laterally of the mandrel and outside of the periphery thereof at a point spaced from the chuck and a thrust plate fixedly mounted on the support positioned between the chuck and the blade.

3. Mechanism for forming a filamentary material into helices comprising a chuck, means for rotating the chuck, a mandrel held by said chuck, an inclined single fixed sharp edged cutting blade carried by and extending laterally of the mandrel, said blade increasing in height toward the free end of the mandrel and spaced from the chuck, a thrust plate between the chuck and blade and positioned between the chuck and blade.

4. Mechanism for forming a filamentary material into helices comprising a chuck, means for rotating the chuck, a mandrel held by said chuck, an inclined single fixed sharp edged cutting blade carried by and extending laterally of the mandrel, said blade increasing in height toward the free end of the mandrel and spaced from the chuck, a stationary thrust plate surrounding the mandrel and interposed between the chuck and blade.

5. Mechanism for forming a wire into helices of one turn each comprising a tank for holding a lubricating liquid, a roll dipping into said tank and about which the wire is adapted to be wrapped, a chuck, means to rotate the chuck, a smooth mandrel held by said chuck, a cutting mechanism consisting of a single cutting blade supported by the mandrel spaced from the chuck, and extending beyond the periphery of the mandrel, and an element having a thrust surface positioned about the mandrel and facing the blade operative to feed the lubricated wire from the roll and which has been wrapped about the mandrel, thereby cutting the wire into helices of one turn each.

6. Mechanism for forming wire into helices of one turn each comprising means for holding a supply of said wire, a chuck, a mandrel held by said chuck, means to direct a wire from said supply to over said mandrel, said mandrel carrying a single fixed sharp edged knife, said knife extending laterally therefrom and at a distance from said chuck, said blade increasing in height toward the free end of said mandrel, a thrust member about the mandrel and located at a distance from the knife, the wire over the mandrel being adapted to be wrapped about the mandrel in abutment with the thrust member and engaged at its fee end with the knife, and means to rotate the chuck whereby the wire will be thrust by the thrust member against the knife and the knife will cut the wire into helices of one turn each.

References Cited in the file of this patent

UNITED STATES PATENTS

| | | |
|---|---|---|
| 367,923 | Peck | Aug. 9, 1887 |
| 617,704 | Alexander | Jan. 17, 1899 |
| 946,531 | Beech | Jan. 18, 1910 |
| 1,081,359 | Braddock | Dec. 16, 1913 |
| 1,856,953 | Forster | May 3, 1932 |
| 1,881,659 | Kellems | Oct. 11, 1932 |
| 2,636,523 | Hammerschlog | Apr. 28, 1953 |
| 2,688,346 | England | Sept. 7, 1954 |

FOREIGN PATENTS

| | | |
|---|---|---|
| 289,770 | Great Britain | Apr. 25, 1929 |